(12) United States Patent
Ito

(10) Patent No.: US 9,849,929 B2
(45) Date of Patent: Dec. 26, 2017

(54) SADDLED VEHICLE

(71) Applicant: Kawasaki Jukogyo Kabushiki Kaisha, Hyogo (JP)

(72) Inventor: Koji Ito, Akashi (JP)

(73) Assignee: KAWASAKI JUKOGYO KABUSHIKI KAISHA (JP)

( * ) Notice: Subject to any disclaimer, the term of this patent is extended or adjusted under 35 U.S.C. 154(b) by 146 days.

(21) Appl. No.: 14/724,677

(22) Filed: May 28, 2015

(65) Prior Publication Data

US 2015/0259019 A1    Sep. 17, 2015

Related U.S. Application Data

(63) Continuation of application No. PCT/JP2013/078839, filed on Oct. 24, 2013.

(30) Foreign Application Priority Data

Dec. 17, 2012    (JP) .................... 2012-274479

(51) Int. Cl.
*B62J 6/04* (2006.01)
*B62J 9/02* (2006.01)
(Continued)

(52) U.S. Cl.
CPC ............. *B62J 6/04* (2013.01); *B60Q 1/2626* (2013.01); *B62J 9/02* (2013.01); *B62K 11/04* (2013.01); *B60Q 1/0088* (2013.01); *B62J 15/04* (2013.01)

(58) Field of Classification Search
CPC ....... B62J 6/04; B62J 9/02; B62J 15/00; B62J 15/04; B62J 23/00; B60Q 1/0088; B60Q 1/26; B60Q 1/2626; B60Q 1/2661; B60Q 1/30; B62K 11/00; B62K 11/02; B62K 11/04

See application file for complete search history.

(56) References Cited

U.S. PATENT DOCUMENTS 6,318,743 B1 * 11/2001 Nakashima .............. B62J 15/00
180/219
8,616,324 B2 * 12/2013 Chipp ........................ B62J 1/12
180/311

(Continued)

FOREIGN PATENT DOCUMENTS

BE          497558       8/2012
CN          1219485      6/1999
(Continued)

OTHER PUBLICATIONS

Partial Supplementary Search Report dated Aug. 18, 2016 for Corresponding European Patent Application No. 13866325.7 (6 pages).

(Continued)

*Primary Examiner* — Joseph M Rocca
*Assistant Examiner* — Maurice L Williams

(57) ABSTRACT

A rear frame (2) of a saddle-riding vehicle supports a rider seat (22) and a passenger seat (24). A tail lamp (26) is supported by rear end portions (66L, 66R) of the rear frame (2). The rear end portions (66L, 66R) of the rear frame (2) are open rearwardly. The tail lamp (26) is disposed in the open region and closes the region between the rear end portions (66L, 66R) of the rear frame (2).

5 Claims, 8 Drawing Sheets

(51) Int. Cl.
    *B62J 15/04*    (2006.01)
    *B62K 11/04*    (2006.01)
    *B60Q 1/00*    (2006.01)
    *B60Q 1/26*    (2006.01)

(56) References Cited

U.S. PATENT DOCUMENTS

| | | | |
|---|---|---|---|
| 8,770,330 B2* | 7/2014 | Inoue | B62J 23/00 180/218 |
| 2003/0132048 A1* | 7/2003 | Hata | B62K 11/00 180/219 |
| 2006/0077676 A1* | 4/2006 | Ohzono | B62J 6/04 362/473 |
| 2007/0045023 A1* | 3/2007 | Okabe | B62J 1/12 180/218 |
| 2007/0230202 A1 | 10/2007 | Ohzono | |
| 2008/0156570 A1* | 7/2008 | Minami | B62J 1/12 180/311 |
| 2008/0230030 A1* | 9/2008 | Kawai | B62K 11/04 123/184.21 |
| 2009/0079156 A1* | 3/2009 | Ichihara | B62J 15/00 280/152.1 |
| 2010/0061058 A1* | 3/2010 | Tanabe | B62K 11/04 361/690 |
| 2010/0194131 A1* | 8/2010 | Shigeta | B62K 19/46 296/37.1 |
| 2011/0074183 A1* | 3/2011 | Kanezuka | B62J 17/00 296/193.08 |
| 2012/0188777 A1* | 7/2012 | Hamauzu | B62J 15/00 362/473 |
| 2012/0320612 A1* | 12/2012 | Yamakura | B62J 6/005 362/473 |

FOREIGN PATENT DOCUMENTS

| | | | |
|---|---|---|---|
| CN | 101801774 | 8/2010 | |
| CN | 102381401 | 3/2012 | |
| DE | 29610426 U1 * | 10/1996 | ............ B62K 11/04 |
| JP | 59-102670 | 6/1984 | |
| JP | 62-9190 | 3/1987 | |
| JP | 2678603 B2 * | 11/1997 | ............... B62J 7/00 |
| JP | 10-250662 | 9/1998 | |
| JP | 10-297569 | 10/1998 | |
| JP | 2011046245 A * | 3/2011 | |
| WO | 2009/038050 | 3/2009 | |
| WO | WO-2009122889 A1 * | 10/2009 | ............ B62J 15/00 |

OTHER PUBLICATIONS

First Office Action dated Oct. 28, 2016 for Corresponding Chinese Patent Application No. 201380065913.5 with English Language translation of the Search Report attached to the Office Action (7 pages).

PCT Application No. PCT/JP2013/078839 International Preliminary Report on Patentability dated Jun. 23, 2015, 8 pages.

PCT/JP2013/078839 International Search Report dated Jan. 28, 2014, 2 pages.

Notification of Reason(s) for Rejection dated Apr. 5, 2016 for corresponding Japan Patent Application No. 2012-274479 with English language summary, 5 pages.

Extended and Supplementary Search Report dated Nov. 22, 2016 for Corresponding European Patent Application No. 13866325.7 (9 pages).

* cited by examiner

SADDLED VEHICLE

CROSS REFERENCE TO THE RELATED APPLICATION

This application is a continuation application, under 35 U.S.C §111(a) of international application No. PCT/JP2013/078839, filed Oct. 24, 2013, which claims priority to Japanese patent application No. 2012-274479, filed Dec. 17, 2012, the entire disclosure of which is herein incorporated by reference as a part of this application.

BACKGROUND OF THE INVENTION

Field of the Invention

The present invention relates to a saddled vehicle or a saddle-riding vehicle which includes a rear frame supporting a seat and a tail lamp supported by a rear end portion of the rear frame.

Description of Related Art

In a saddle-riding vehicles such as a motorcycle, it has been known that rear ends of a pair of left and right rear frames are connected to each other by means of a cross pipe extending in a vehicle widthwise direction, and a tail lamp is supported by the cross pipe (for example, Patent Document 1). With this configuration, a large tail lamp having a large width can be supported stably.

RELATED DOCUMENT

Patent Document

[Patent Document 1] JP Examined Utility Model Publication No. S62-009190

However, in the mounting structure according to Patent Document 1, the cross pipe is disposed at the rear ends of the rear frames, and thus, the structure becomes complicated and the width of the rear end of the motorcycle body is increased, resulting in bulky appearance.

SUMMARY OF THE INVENTION

In view of the above problem, an object of the present invention is to provide a saddle-riding vehicle to which a large tail lamp having a large width can be mounted, while the width of the rear end of the rear frame is kept small.

In order to achieve the above object, a saddle-riding vehicle of the present invention is a saddle-riding vehicle including: a rear frame configured to support a seat; and a tail lamp supported by a rear end portion of the rear frame, wherein the rear end portion of the rear frame is open, and the rear end portion of the rear frame is closed by the tail lamp. Here, the "rear end portion is open" refers to a state where the rear end portion is formed by a pair of left and right members and where the pair of left and right members are not connected to each other.

According to this configuration, the rear end portion of the rear frame is open, and the open rear end portion is closed by the tail lamp. Thus, the width of the rear end portion of the rear frame can be made so small as to be substantially the same as the width of the tail lamp. Therefore, a large tail lamp having a large width can be mounted, while the width of the rear end of the rear frame is kept small.

In the present invention, preferably, one of the tail lamp and the rear frame has an engaging portion formed therein, and another of the tail lamp and the rear frame has a to-be-engaged portion formed therein, in which the engaging portion is engaged with the to-be-engaged portion from rear. In such case, a front end portion of the tail lamp may be connected to the rear frame by means of a bolt. According to this configuration, by use of the open region in the rear end portion of the rear frame, the tail lamp can be inserted from rear into the rear frame, whereby the engaging portion can be easily engaged with the to-be-engaged portion. Since the front end portion of the tail lamp can be connected to the rear frame by means of bolts in a state where the tail lamp is engaged with the rear frame, workability is improved, and in addition, only a small number of sites where bolt connection is performed is required. As a result, assembling the tail lamp to the motorcycle body is facilitated.

In the present invention, preferably, the saddle-riding vehicle further includes a rear fender supported by the rear frame and configured to cover an area below the rear frame, and an engine control unit disposed forward of the tail lamp and supported by the rear fender. In such case, the rear frame may have an upright wall configured to partition a space where the tail lamp is disposed, and a space where the engine control unit is disposed, and the upright wall may prevent access from a tail lamp side to the engine control unit. According to this configuration, the upright wall prevents access from the tail lamp side to the engine control unit, and thus, theft of the engine control unit is prevented.

In a case where the saddle-riding vehicle includes the engine control unit, preferably, the saddle-riding vehicle further includes an ECU cover supported by the rear frame and configured to cover an area above the engine control unit. According to this configuration, access from above to the engine control unit is also prevented, and thus, security for the engine control unit is further improved. In addition, even when rain has entered through a gap or the like in the seat, water can be prevented from attaching to the engine control unit.

In the present invention, preferably, the saddle-riding vehicle further includes a rear fender supported by the rear frame and configured to cover an area below the rear frame, a rear flap supported by the rear frame and extending rearward, a tool box disposed forward of the tail lamp and configured to accommodate a tool, and a luggage hook with which a band for fixing the tool is engaged. In such case, the rear fender, the rear flap, and the luggage hook are fastened together to the rear frame by a common fastening member. Instead of the tool box, an on-vehicle apparatus may be disposed forward of the tail lamp, and an apparatus mounting bracket configured to mount the on-vehicle apparatus to the motorcycle body may be fastened to the rear frame by a common fastening member, together with the rear fender and the rear flap. The on-vehicle apparatus is a GPS unit, for example. According to this configuration, the luggage hook or the apparatus mounting bracket is fastened to the rear frame, together with the rear fender and the rear flap. Thus, the number of components is reduced, and in addition, only a small number of sites where fastening is performed is required. Thus, assembling is facilitated.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

Hereinafter, preferred embodiments of the present invention will be described with reference to the drawings. In the description herein, "left side" and "right side" refer to the left side and right side, respectively, as viewed by a rider riding a vehicle.

Figure 1:
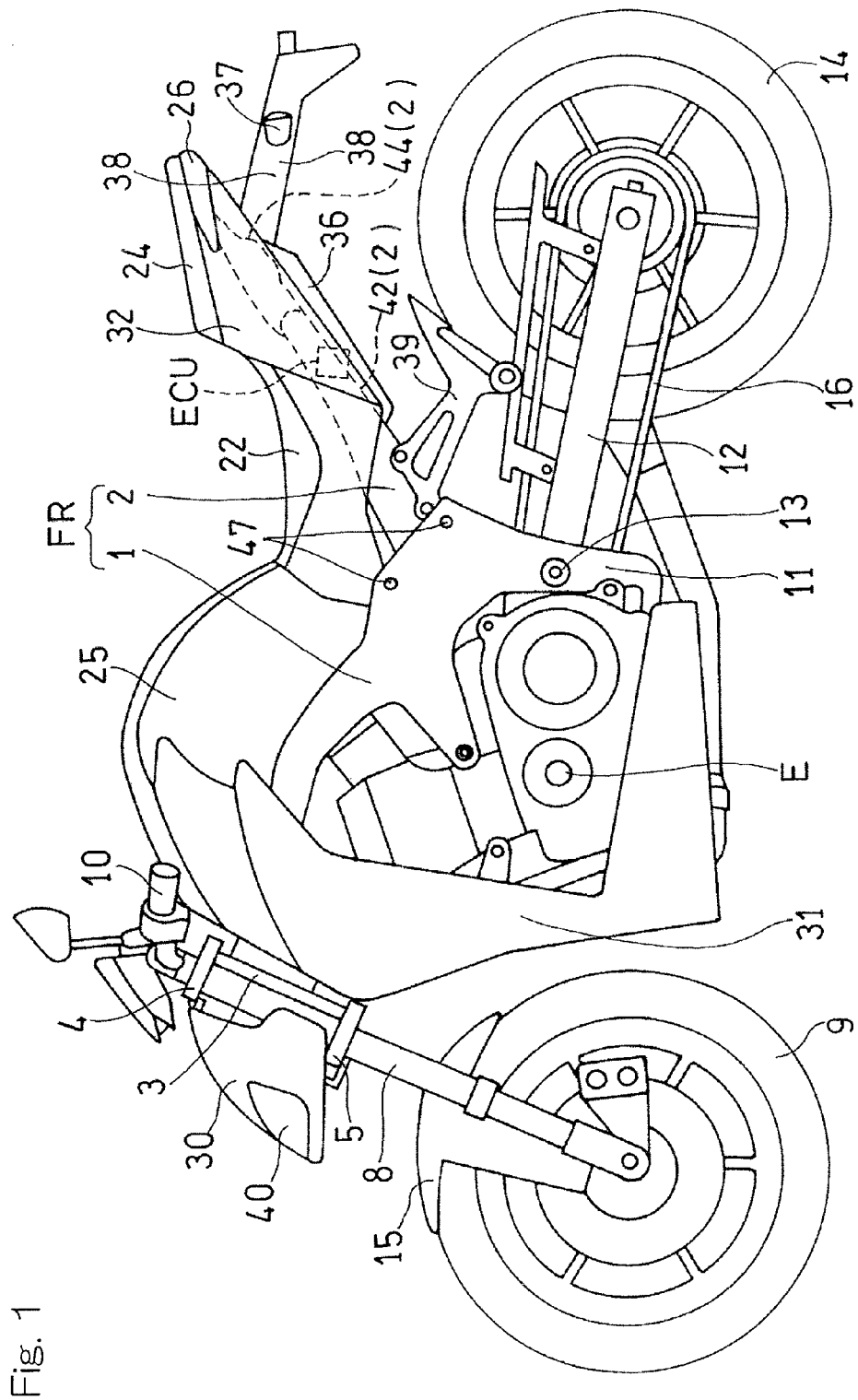
FIG. 1 is a side view showing a motorcycle being one type of a saddle-riding vehicle according to a first preferred embodiment of the present invention.

FIG. 1 shows a motorcycle being one type of a saddle-riding vehicle to which the present invention is applied. A motorcycle frame structure FR of the motorcycle includes a main frame 1, which forms a front portion of the motorcycle frame structure FR, and a rear frame 2 which forms a rear portion of the motorcycle frame structure FR. The rear frame 2 is connected to a rear portion of the main frame 1. A head pipe 3 is mounted to a front end of the main frame 1, and a steering shaft (not shown) is rotatably inserted into the head pipe 3. A top bridge 4 and a bottom bridge 5 are mounted to the steering shaft, and a front fork 8 is supported by the top bridge 4 and the bottom bridge 5. A front wheel 9 is supported by a lower end portion of the front fork 8, and a front fender 15 is mounted above the front wheel 9. A steering handle 10 is mounted to the top bridge 4 at an upper end portion of the front fork 8.

A swingarm bracket 11 is provided at a rear end portion of the main frame 1. A swingarm 12 is supported for movement in up and down directions by the swingarm bracket 11 via a pivot pin 13 which is inserted in a front end portion of the swing arm 12. A rear wheel 14 is supported by a rear end portion of the swingarm 12. A combustion engine E is supported at a position below an inter mediate portion of the main frame 1, and the combustion engine E drives the rear wheel 14 via a power transmission mechanism 16 such as a chain.

A rider seat 22 and a passenger seat 24 are supported by the rear frame 2, and a tail lamp 26 is disposed at a rear end portion of the rear frame 2. A portion of the rear frame 2, below the rider seat 22 and the passenger seat 24, is covered with a rear cover 32 from the outer lateral side. Below the rear frame 2, a rear fender 36 made of resin is mounted so as to be located above the rear wheel 14, and a rear flap 38 made of resin is mounted to a rear portion of the rear fender 36. A turn indicator 37 is supported by the rear flap 38.

An engine control unit ECU is disposed forward of the tail lamp 26 and below the rider seat 22, and is supported by the rear fender 36. A fellow passenger foot rest bracket 39 is supported by a front portion of the rear frame 2.

A fuel tank 25 is disposed above the main frame 1, i.e., above the motorcycle body and between the steering handle 10 and the rider seat 22. A headlamp device 40 is supported by the top bridge 4 and the bottom bridge 5, and a front fairing 30 made of resin is supported by the headlamp device 40. The front fairing 30 covers the headlamp device 40 from above, below, and both lateral sides. A side fairing 31 made of resin is disposed rearward of the front fairing 30, and the side fairing 31 covers an area from a lower portion of the fuel tank 25 to a front portion and a lower portion of the combustion engine E.

Figure 2:
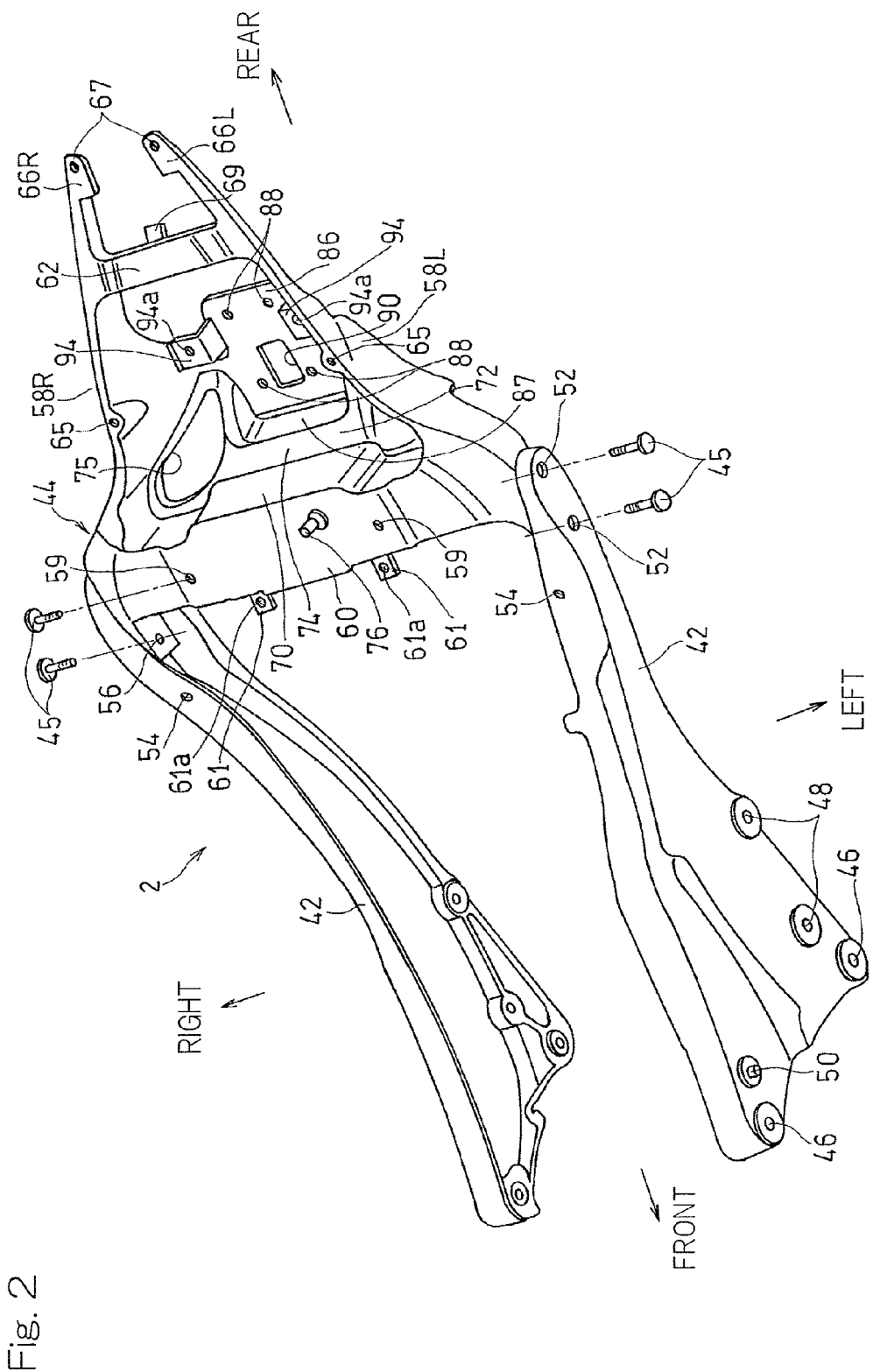
FIG. 2 is a perspective view of a rear frame of the motorcycle, viewed obliquely from left and above.

As shown in FIG. 2, the rear frame 2 includes a pair of left and right rear frame front parts 42 and 42, which form a front portion of the rear frame 2, and a rear frame rear part 44 which forms a rear portion of the rear frame 2. Each of the rear frame front parts 42 and the rear frame rear part 44 is, for example, a cast article made of metal such as aluminium. Rear end portions of the rear frame front parts 42 and a front end portion of the rear frame rear part 44 are connected to each other by means of bolts 45, with the front end portion of the rear frame rear part 44 disposed inward of the rear end portions of the rear frame front parts 42. As shown in FIG. 1, the rear frame front parts 42 support the rider seat 22 and the rear frame rear part 44 supports the passenger seat 24.

Each rear frame front part 42 shown in FIG. 2 is an elongated member which extends in a front-rear direction or a longitudinal direction and dimension of which in the up-down direction or a vertical direction gradually decreases towards the rear. In an upper end portion and a lower end portion of a front end portion of each rear frame front part 42, threaded holes 46 and 46 facing the vehicle widthwise direction (left-right direction) are formed. The main frame 1 shown in FIG. 1 is disposed on the rear frame front parts 42 from the outer lateral sides thereof, and then, bolts 47 are fastened into the threaded holes 46 (FIG. 2) in the rear frame front parts 42. Accordingly, the main frame 1 and the rear frame 2 are connected to each other.

As shown in FIG. 2, rearwardly of the threaded holes 46 in the lower end portion of each rear frame front part 42, two threaded holes 48 and 48 are provided so as to be arranged in the longitudinal direction. The threaded holes 48 and 48 are used for supporting the fellow passenger foot rest bracket 39 (FIG. 1). Rearwardly of the threaded holes 46 in the upper end portion of each rear frame front part 42, a pin 50 projecting to the outer lateral side is formed. Further, in the rear end portion of each rear frame front part 42, two bolt insertion holes 52 are formed so as to be arranged in the longitudinal direction. The bolt 45 is inserted in each bolt insertion hole 52. In a rear portion of each rear frame front part 42, specifically, slightly forward of the bolt insertion holes 52, an insertion hole 54 facing the vertical direction is formed.

Threaded holes 56 are formed at the front end of the rear frame rear part 44. The bolt 45 is screwed into each threaded hole 56. FIG. 2 shows only one threaded hole 56 on the right side. The width of the rear frame rear part 44 is largest at the front end thereof, gradually decreases towards the rear, and becomes smallest at the rear end thereof. Specifically, the rear frame rear part 44 includes left and right frame pieces 58L and 58R, which respectively extend rearward while curving inwardly from the left and right connected portions to the rear frame front parts 42. Front ends and rear portions of the left and right frame pieces 58L and 58R are connected to each other by means of a first cross member 60 and a second cross member 62 which each extends in the vehicle widthwise direction.

Each of the first and second cross members 60 and 62 has a plate-like shape elongated in the vehicle widthwise direction, and is formed integrally with the left and right frame pieces 58L and 58R by means of casting. In a front edge portion of the first cross member 60, two projecting pieces 61 each projecting forward are formed so as to be arranged in the vehicle widthwise direction. In each projecting piece 61, a threaded hole 61a facing the vertical direction is formed. In the upper surface of the first cross member 60, two cover mounting threaded holes 59 facing the vertical direction are formed so as to be arranged in the vehicle widthwise direction. Each of the threaded holes 61a and the cover mounting threaded holes 59 is formed as a welding nut, for example. An engaging portion 69 extending obliquely rearward and downward is formed in a rear edge portion of the second cross member 62.

Figure 3:
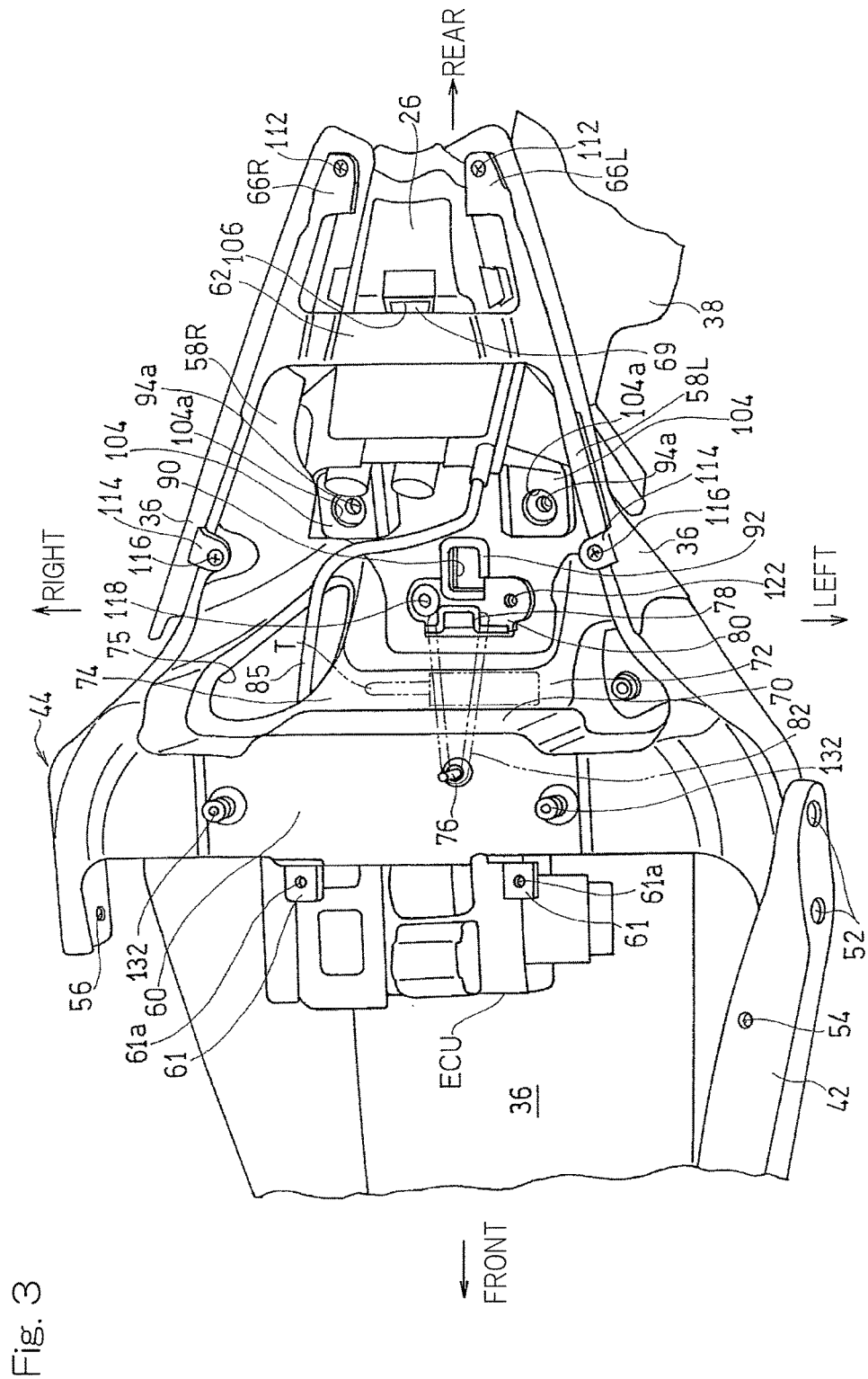
FIG. 3 is a plan view showing a rear portion of the motorcycle with a seat removed.

A front portion of each of the left and right frame pieces 58L and 58R has a large dimension in the vertical direction, and a rear portion thereof has a small dimension in the vertical direction and is in an elongated bar shape projecting rearward. Rear ends 66L and 66R of the bar shapes are not connected to each other to be open. That is, the rear end portions 66L and 66R of the rear frame 2 are open. As shown in FIG. 3, the tail lamp 26 is disposed in this open region so as to fill in or close the region between the rear end portions 66L and 66R of the rear frame 2. That is, the dimension in the widthwise direction of the rear end of the rear frame 2 is substantially the same as the dimension in the widthwise direction of the rear end of the tail lamp 26. In FIG. 3, the rear frame front part 42 on the right side and an ECU cover 68 described later are omitted.

As shown in FIG. 2, fender mounting threaded holes 65 and 65 facing the vertical direction are formed in the upper surfaces of front portions of the left and right frame pieces 58L and 58R, respectively. Fender mounting holes 67 and 67 which are through-holes facing the vertical direction are formed in the rear ends 66L and 66R of the left and right frame pieces 58L and 58R, respectively.

A front wall 70 is formed in the rear frame rear part 44. The front wall 70 is composed of an upright wall extending downward from the rear edge of the first cross member 60. The front wall 70 is continued to the left and right frame pieces 58L and 58R. Further, a lower wall 72 is formed in the rear frame rear part 44. The lower wall 72 extends rearward from a lower edge of the front wall 70 and is continued to the left and right frame pieces 58L and 58R. The front wall 70, the left and right frame pieces 58L and 58R, and the lower wall 72 cooperate together to form a tool box 74 which accommodates a tool. The tool box 74 is in a box shape open to the upper side. A cable opening 75 is formed on the right side of the tool box 74, in a portion extending from the lower wall 72 to the right frame piece 58R. A cable 85 of the tail lamp 26 shown in FIG. 3 passes through the cable opening 75.

The tool box 74 is disposed forward of the tail lamp 26. A front luggage hook 76 is formed on the upper surface of the first cross member 60. The front luggage hook 76 is composed of a projection that projects upward. A rear luggage hook 78 formed by a wire is provided rearward of the tool box 74 and forward of the tail lamp 26. The rear luggage hook 78 is supported by the rear frame rear part 44 via a hook bracket 80. The rear luggage hook 78 is fixed to the hook bracket 80 by means of welding. The tool T disposed in the tool box 74 is fixed by means of a band 82 wound around the front and rear luggage hooks 76 and 78.

The engine control unit ECU is disposed on the upper surface of the rear fender 36, forward of the front wall 70 of the rear frame rear part 44. That is, the front wall 70 defining the upright wall partitions the space, where the tool box 74 and the tail lamp 26 are disposed, and the space where the engine control unit ECU is disposed. Accordingly, access from the tool box 74 side and the tail lamp 26 side to the engine control unit ECU is prevented.

As shown in FIG. 2, a flap mounting portion 86 is provided rearward of the tool box 74 in the rear frame rear part 44. The flap mounting portion 86 has a plate-like shape facing obliquely forward and upward, and is continued to the lower wall 72 and the left and right frame pieces 58L and 58R. Specifically, the front edge of the flap mounting portion 86 is provided lower than the lower wall 72 forming the bottom surface of the tool box 74, and is continued to the lower wall 72 via a rear wall 87.

Flap mounting holes 88 each being a through-hole are formed in the flap mounting portion 86. In each of a front portion and a rear portion of the flap mounting portion 86, two flap mounting holes 88 are provided so as to be arranged in the vehicle widthwise direction. A cable introduction hole 90 having a rectangular shape is formed at a range from a front portion to a middle portion of the flap mounting portion 86. A harness (not shown) of the turn indicator 37 mounted to the rear flap 38 shown in FIG. 1 is introduced from the cable introduction hole 90, and passes through the cable opening 75 shown in FIG. 2, so as to be guided to the front side of the motorcycle body.

As shown in FIG. 3, the cable introduction hole 90 has its substantially entire periphery surrounded by a harness guide 92 mounted to the hook bracket 80. The harness guide 92 is made of a wire, and is fixed to the hook bracket 80 by means of welding. With the provision of the harness guide 92, the harness of the turn indicator 37 (FIG. 1) is prevented from being damaged. The harness guide 92 may not be provided.

In both lateral portions of a rear portion of the flap mounting portion 86 shown in FIG. 2, tail lamp mounting portions 94 and 94 are formed so as to be connected to the left and right frame pieces 58L and 58R, respectively. A tail lamp mounting threaded hole 94a facing the vertical direction is formed in each tail lamp mounting portion 94.

Figure 4:
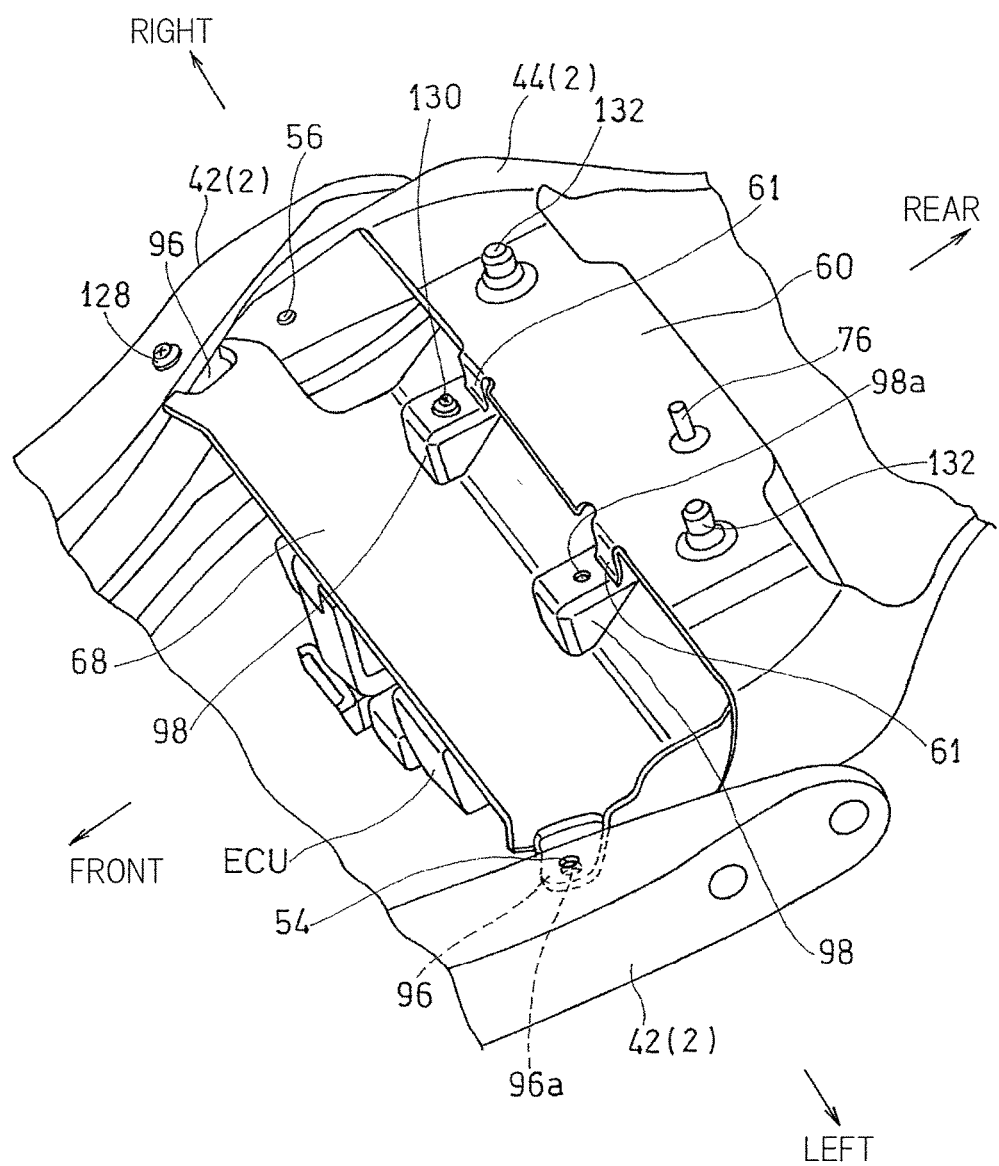
FIG. 4 is a perspective view of a part of the rear portion of the motorcycle, viewed obliquely from left and above.

As shown in FIG. 4, the ECU cover 68 is disposed above the engine control unit ECU. The ECU cover 68 covers the entirety of the engine control unit ECU from above. The ECU cover 68 includes mounting pieces 96 and 96 in both lateral portions of a front portion thereof, and a mounting threaded hole 96a is formed in each mounting piece 96. In a rear portion of the ECU cover 68, two mounting portions 98 and 98 are formed so as to be arranged in the vehicle widthwise direction, and an insertion hole 98a is formed in each mounting portion 98. These portions are used for connection by means of screws 130 as described later.

Figure 5:
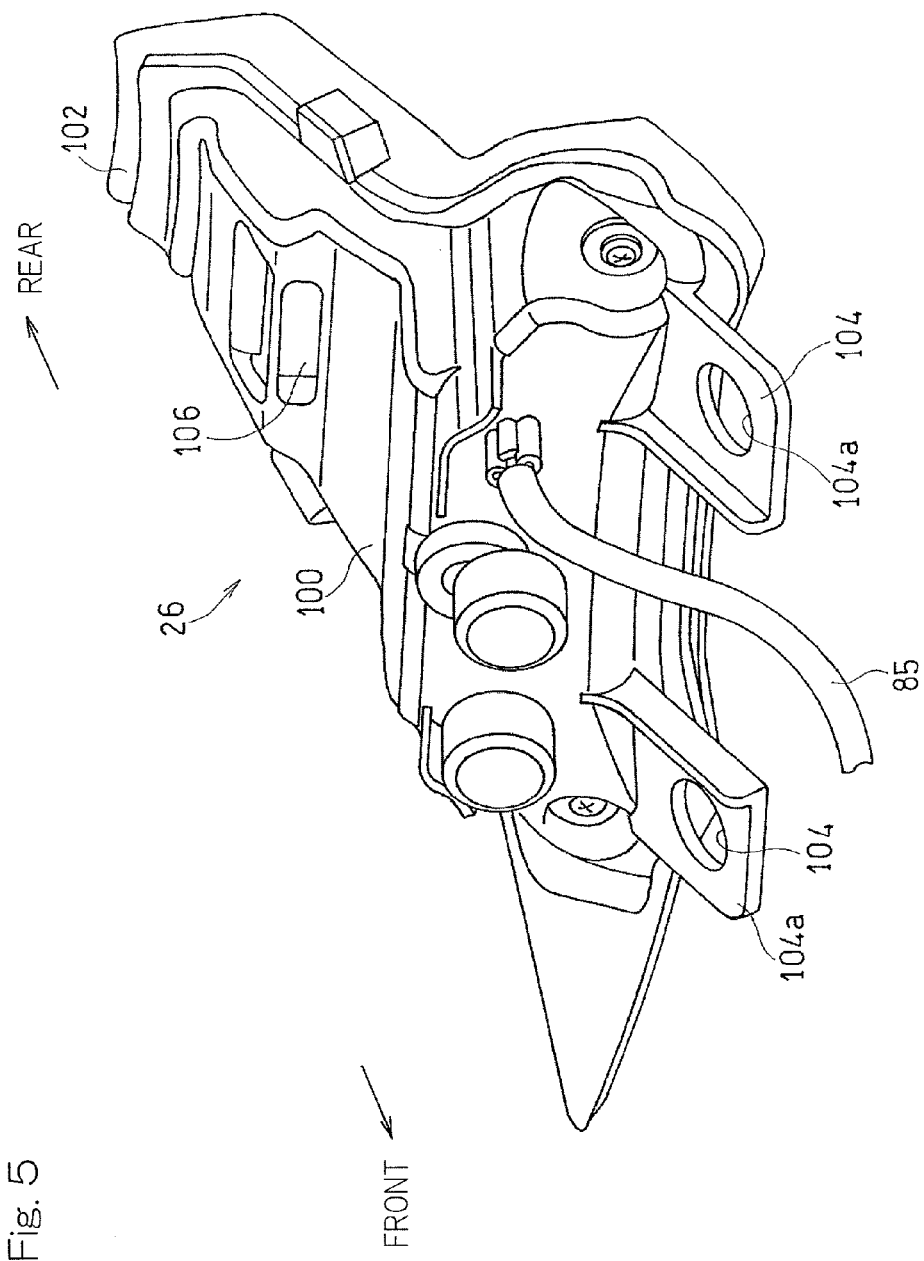
FIG. 5 is a perspective view of a tail lamp of the motorcycle, viewed obliquely from front and above.

FIG. 5 is a perspective view of the tail lamp 26, viewed obliquely from left and front. The tail lamp 26 includes a lamp body portion 100 including a plurality of lamps (not shown) each composed of a light emitting diode and a cover lens portion 102 made of resin. The cover lens portion 102 is mounted to the lamp body portion 100 and forms a light emitting surface.

In a front end portion of the lamp body portion 100, two front portion supporting pieces 104 and 104 are provided so as to be arranged in the vehicle widthwise direction. A through-hole 104a facing the vertical direction is formed in each front portion supporting piece 104. An to-be-engaged portion 106 open to the front is formed in an upper portion of an intermediate portion in the longitudinal direction of the lamp body portion 100.

A method for mounting the tail lamp 26, the rear fender 36, the rear flap 38, and the rear cover 32 to the rear frame 2 shown in FIG. 1 will be described. First, the tail lamp 26 is mounted to the rear frame 2. As shown in an arrow A in FIG. 6, by use of the open region between the rear end portions 66L and 66R of the rear frame 2, the tail lamp 26 is moved forward from the rear, so as to cause the to-be-engaged portion 106 of the tail lamp 26 to be engaged with the engaging portion 69 of the rear frame 2.

Further, a cylindrical elastic grommet 108 provided with flanges at both ends thereof is fitted into the through-hole 104a of each front portion supporting piece 104 in the front end portion of the tail lamp 26, and then, a bolt 110 is inserted into a center hole 108a of the elastic grommet 108, so as to be fastened into the tail lamp mounting threaded hole 94a (FIG. 3) in the tail lamp mounting portion 94 of the rear frame 2. Accordingly, the tail lamp 26 is supported by the rear frame 2.

Subsequently, the rear fender 36 and the rear flap 38 shown in FIG. 3 are mounted to the rear frame 2. Left and right mounting pieces 114 and 114 provided in the rear fender 36 are located above the rear frame 2, and fastening members 116 are inserted from above into insertion holes (not shown) formed in the mounting pieces 114, respectively, so as to be screwed into the fender mounting threaded holes 65 of the rear frame 2 shown in FIG. 2. Further, fastening members 112 shown in FIG. 3 are respectively inserted from above into the fender mounting holes 67 and 67 in the rear end portion of the rear frame 2, so as to be screwed into threaded holes (not shown) provided in the rear fender 36.

Figure 7:
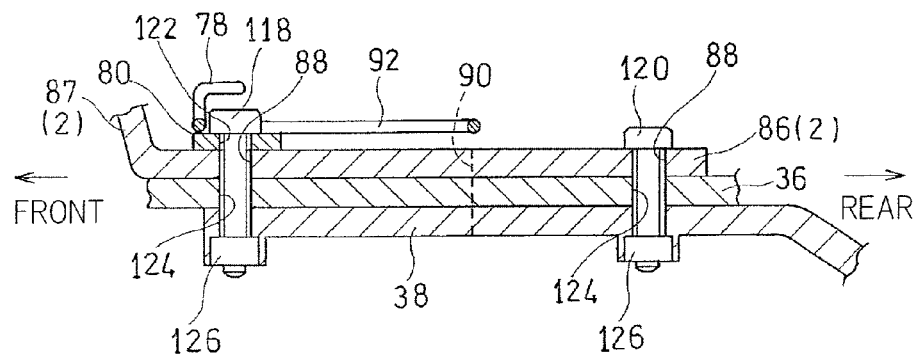
FIG. 7 is a cross-sectional view showing a mounting structure for the rear frame and a rear flap.

Then, the rear flap 38 is mounted to the rear frame 2 so as to hold the rear fender 36 therebetween. Specifically, as shown in FIG. 7, the rear flap 38 is brought into contact with the lower surface of the rear fender 36, and the rear flap 38 is mounted to the rear frame 2 by means of two bolts 118 on the front side and two bolts 120 on the rear side.

The bolts 118 on the front side are inserted from above into through-holes 122 provided in the hook bracket 80, the flap mounting holes 88 in the flap mounting portion 86 of the rear frame 2, and the insertion holes 124 provided in the rear fender 36, respectively, in this order, so as to be fastened into insert nuts 126 cast in the rear flap 38 by means of insert molding, respectively. That is, the bolts 118 on the front side fasten the rear fender 38, the rear flap 38, and the luggage hook 78 together to the rear frame 2.

On the other hand, the bolts 120 on the rear side are inserted from above into the flap mounting holes 88 in the flap mounting portion 86 of the rear frame 2 and the insertion holes 124 provided in the rear fender 36 in this order, so as to be fastened into insert nuts 126 in the rear flap 38, respectively. Accordingly, the rear flap 38 is supported by the rear frame 2, and the rear portion of the rear fender 36 is firmly supported by the rear frame 2. Although not shown, the front portion of the rear fender 36 is supported by the front portion of the rear frame 2 by being screwed thereto.

Further, the engine control unit ECU shown in FIG. 3 is fixed to the upper surface of the rear fender 36, and the ECU cover 68 shown in FIG. 4 is disposed above the engine control unit ECU. Specifically, screws 128 are inserted from above into the insertion holes 54 of the rear frame 2, so as to be screwed into the mounting threaded holes 96a in the mounting pieces 96 of the ECU cover 68, respectively. Screws 130 are inserted from above into the insertion holes 98a in the mounting portions 98 of the ECU cover 68, respectively, so as to be screwed into the threaded holes 61a (FIG. 3) of the projecting pieces 61 of the first cross member 60, respectively. Accordingly, the ECU cover 68 is supported by the rear frame 2.

Then, the rear cover 32 shown in FIG. 1 is mounted to the rear frame 2. The pins 50 provided in the rear frame 2 shown in FIG. 2 are inserted into engagement holes (not shown) provided in a front portion of the rear cover 32, thereby to position the rear cover 32. In this state, the rear portion of the rear cover 32 is fixed to the first cross member 60 of the rear frame 2 by fastening bolts 132 shown in FIG. 3 into the cover mounting threaded holes 59 in the first cross member 60. The rear cover 32 shown in FIG. 1 is provided with engagement claws (not shown) as necessary, and the engagement claws are engaged with engagement grooves (not shown) provided in the rear fender 36. That is, the rear cover 32 is supported through insertion and engagement, except that the rear portion thereof is fastened by means of the bolts 132 (FIG. 3). Accordingly, assembling the rear cover 32 is facilitated.

In the above configuration, as shown in FIG. 3, the rear end portions 66L and 66R of the rear frame 2 are open, and the open region between the rear end portions 66L and 66R is closed by the tail lamp 26. Accordingly, it is sufficient that the width between the rear end portions 66L and 66R of the rear frame 2 is substantially the same as the width of the tail lamp 26. Therefore, the large tail lamp 26 having a large width can be mounted, while the width between the rear end portions 66L and 66R of the rear frame 2 is kept small.

Figure 6:
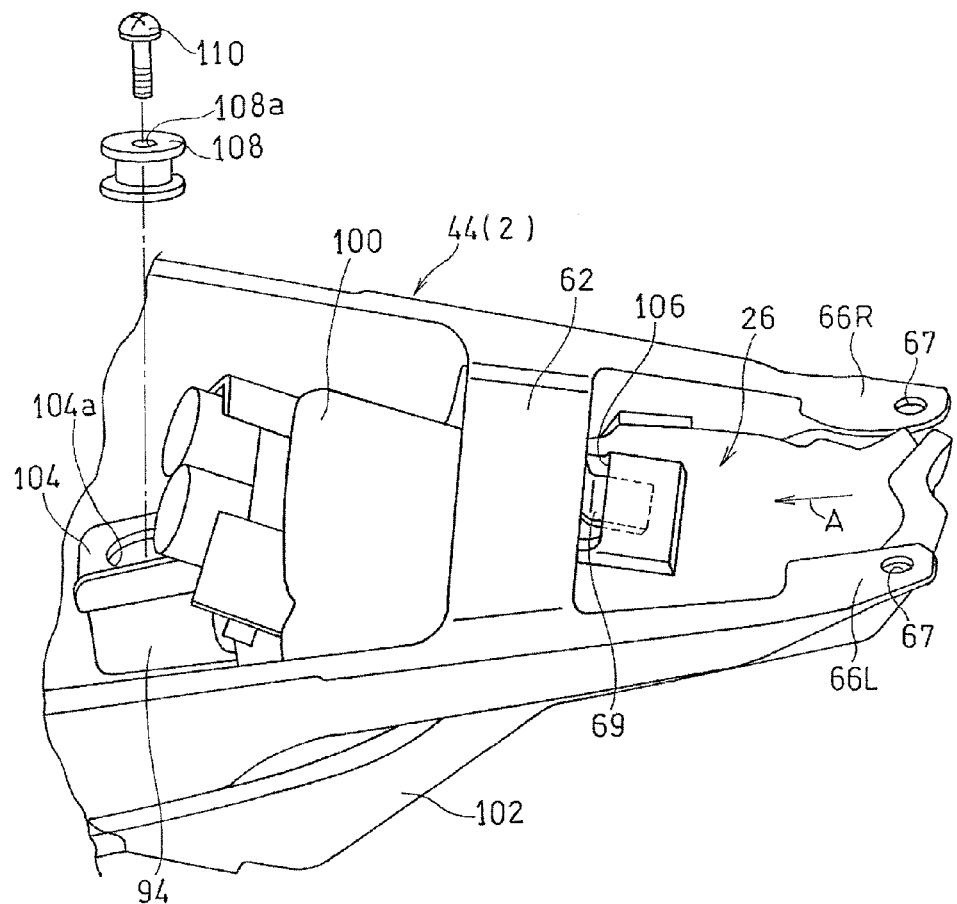
FIG. 6 is a perspective view showing a mounting structure for the rear frame and the tail lamp, viewed obliquely from left and above.

As shown in FIG. 6, by use of the open region between the rear end portions 66L and 66R of the rear frame 2, the to-be-engaged portion 106 of the tail lamp 26 can be inserted from behind so as to be engaged with the engaging portion 69 of the rear frame 2. Thus, the tail lamp 26 can be easily engaged with the rear frame 2. Since the front end portion of the tail lamp 26 is connected to the rear frame 2 by means of the bolts 110 in a state where the tail lamp 26 is engaged with the rear frame 2, workability is improved, and in addition, only a small number of sites where bolt connection is performed is required. As a result, assembling the tail lamp 26 to the motorcycle body is facilitated.

The front wall 70 shown in FIG. 3 formed in the rear frame 2 prevents access from the tail lamp 26 side and from the tool box 74 side to the engine control unit ECU. Thus, theft of the engine control unit ECU is prevented.

Further, the ECU cover 68 shown in FIG. 4 also prevents access from above to the engine control unit ECU. Thus, security for the engine control unit ECU is further improved. Even when rain has entered through a gap or the like between the rider seat 22 and the passenger seat 24 shown in FIG. 1, water can be prevented from attaching to the engine control unit ECU.

As shown in FIG. 6, the rear luggage hook 78 is fastened to the rear frame 2, together with the rear fender 36 and the rear flap 38. Therefore, the number of components is reduced, and in addition, only a small number of sites where fastening is performed is required, and thus, assembling is facilitated.

Figure 8:
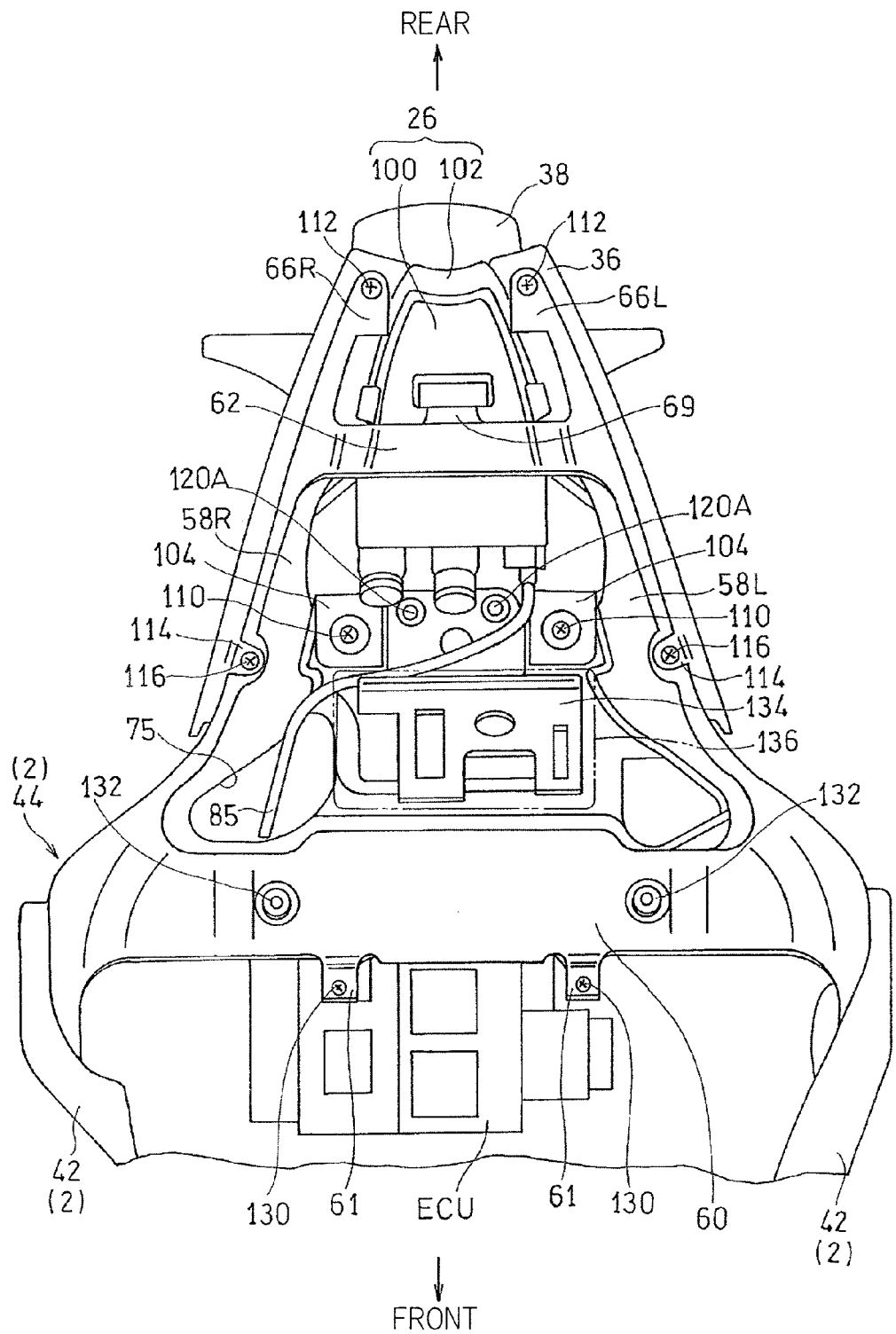
FIG. 8 is a plan view of a rear portion of a motorcycle being one type of a saddle-riding vehicle according to a second preferred embodiment of the present invention, with a seat removed.

FIG. 8 is a plan view showing a rear portion of a motorcycle, one type of a saddle-riding vehicle, according to a second preferred embodiment of the present invention. In the first preferred embodiment, the tool box 74 is provided rearward of the tail lamp 26. Instead of this, in the second preferred embodiment, an on-vehicle apparatus such as a GPS unit 136, for example, is disposed rearward of the tail lamp 26. The GPS unit 136 is mounted to an apparatus mounting bracket 134, and the apparatus mounting bracket 134 is supported by the rear frame 2 by means of bolts 118A and 120A. The other configuration is the same as that of the first preferred embodiment. The on-vehicle apparatus is not limited to the GPS unit 136.

Figure 9:
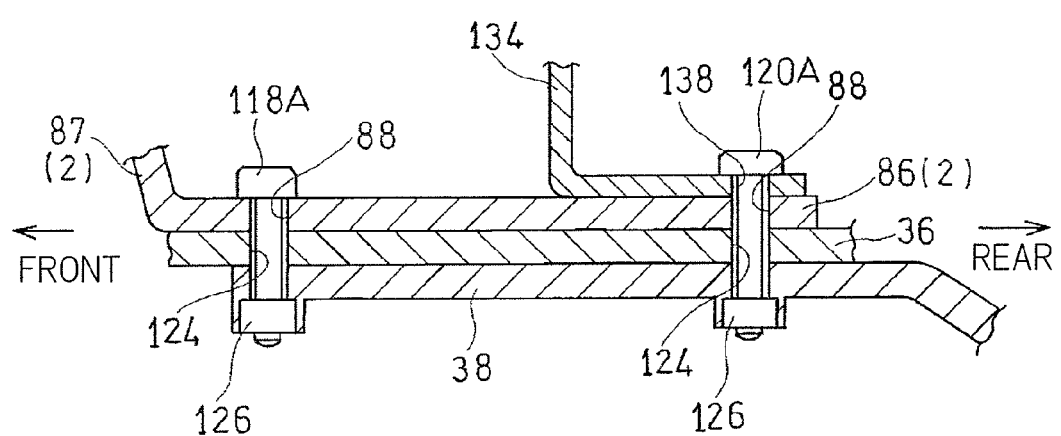
FIG. 9 is a cross-sectional view showing a mounting structure for the rear frame and the rear flap.

A method for supporting the mounting bracket 134 will be described with reference to FIG. 9. The bolts 118A on the front side are inserted from above into the flap mounting holes 88 in the flap mounting portion 86 of the rear frame 2 and the insertion holes 124 provided in the rear fender 36, respectively, in this order, so as to be fastened into the insert nuts 126 cast in the rear flap 38 by means of insert molding.

On the other hand, the bolts 120A on the rear side are inserted from above into insertion holes 138 provided in the mounting bracket 134, the flap mounting holes 88 in the flap mounting portion 86 of the rear frame 2 and the insertion holes 124 provided in the rear fender 36, respectively, in this order, so as to be fastened into the insert nuts 126 in the rear flap 38, respectively. That is, the bolts 120A on the rear side fasten the rear fender 36, the rear flap 38 and the mounting bracket 134 together to the rear frame 2.

Also the second preferred embodiment can achieve effects similar to those in the first preferred embodiment. Further, according to the second preferred embodiment, the on-vehicle apparatus such as the GPS unit 136 can be provided forward of the tail lamp 26, and in addition, the mounting bracket 134 therefor is fastened to the rear frame 2 together with the rear fender 36 and the rear flap 38. Thus, the number of components is reduced, and only a small number of sites where fastening is performed is required, and thus, assembling is facilitated.

The present invention is not limited to the preferred embodiments described above, and various additions, modifications, or deletions may be made without departing from the gist of the invention. For example, in each preferred embodiment above, the rear frame 2 is provided with the engaging portion 69, and the tail lamp 26 is provided with the to-be-engaged portion 106. However, the rear frame 2 may be provided a to-be-engaged portion, and the tail lamp 26 may be provided with an engaging portion. Thus, such configurations are also included in the scope of the present invention.

REFERENCE NUMERALS

2 . . . rear frame
22 . . . rider seat (seat)
24 . . . passenger seat (seat)
26 . . . tail lamp
36 . . . rear fender
38 . . . rear flap
68 . . . ECU cover
69 . . . engaging portion
70 . . . front wall (upright wall)
74 . . . tool box
78 . . . rear luggage hook (luggage hook)
106 . . . to-be-engaged portion
134 . . . apparatus mounting bracket
136 . . . GPS unit (on-vehicle apparatus)
ECU . . . engine control unit

What is claimed is:

1. A saddle-riding vehicle comprising:
a rear frame configured to support a seat; and
a tail lamp supported by a rear end portion of the rear frame, wherein
the rear end portion of the rear frame is open,
the rear end portion of the rear frame is closed by the tail lamp,
the rear frame includes a rear frame front part which forms a front portion of the rear frame and a rear frame rear part which forms a rear portion of the rear frame, the rear frame front part and the rear frame rear part being connected to each other by means of bolts, and
the rear frame rear part includes left and right frame pieces, and the width of the rear frame rear part gradually decreases towards a motorcycle rear,
further comprising:
a rear fender supported by the rear frame and configured to cover an area below the rear frame; and
an engine control unit disposed forward of the tail lamp and supported by the rear fender, wherein:
the rear frame has an upright wall formed therein, the upright wall being configured to partition a space where the tail lamp is disposed, and a space where the engine control unit is disposed; and
the upright wall prevents access from a tail lamp side to the engine control unit;
front ends of the left and right frame pieces are connected to each other by means of a first cross member which extends in a vehicle widthwise direction;
a front portion of each of the left and right frame pieces has a large dimension in a vertical direction, and a rear portion thereof has a small dimension in the vertical direction; and
the upright wall extends downward from a rear edge of the first cross member, and is continued to the left and right frame pieces.

2. The saddle-riding vehicle as claimed in claim 1, wherein
one of the tail lamp and the rear frame has an engaging portion formed therein, and another of the tail lamp and the rear frame has a to-be-engaged portion formed therein, the engaging portion being engaged with the to-be-engaged portion from the motorcycle rear, and
a front end portion of the tail lamp is connected to the rear frame by means of a bolt.

3. The saddle-riding vehicle as claimed in claim 1, further comprising an engine control unit cover supported by the rear frame and configured to cover an area above the engine control unit.

4. A saddle-riding vehicle comprising:
a rear frame configured to support a seat;
a tail lamp supported by a rear end portion of the rear frame;
a rear fender supported by the rear frame and configured to cover an area below the rear frame;

a rear flap supported by the rear frame and extending rearward;

a tool box disposed forward of the tail lamp and configured to accommodate a tool; and a luggage hook with which a band for fixing the tool is engaged, wherein the rear end portion of the rear frame is open, the rear end portion of the rear frame is closed by the tail lamp, and the rear fender, the rear flap, and the luggage hook are fastened together to the rear frame by a common fastening member.

5. A saddle-riding vehicle comprising:

a rear frame configured to support a seat;

a tail lamp supported by a rear end portion of the rear frame;

a rear fender supported by the rear frame and configured to cover an area below the rear frame;

a rear flap supported by the rear frame and extending rearward; and an apparatus mounting bracket configured to mount, to a motorcycle body, an on-vehicle apparatus disposed forward of the tail lamp, wherein the rear end portion of the rear frame is open, the rear end portion of the rear frame is closed by the tail lamp, and the rear fender, the rear flap, and the apparatus mounting bracket are fasten together to the rear frame by a common fastening member.

* * * * *